(No Model.)
J. S. CORBAN.
Carriage Spring.
No. 231,278. Patented Aug. 17, 1880.
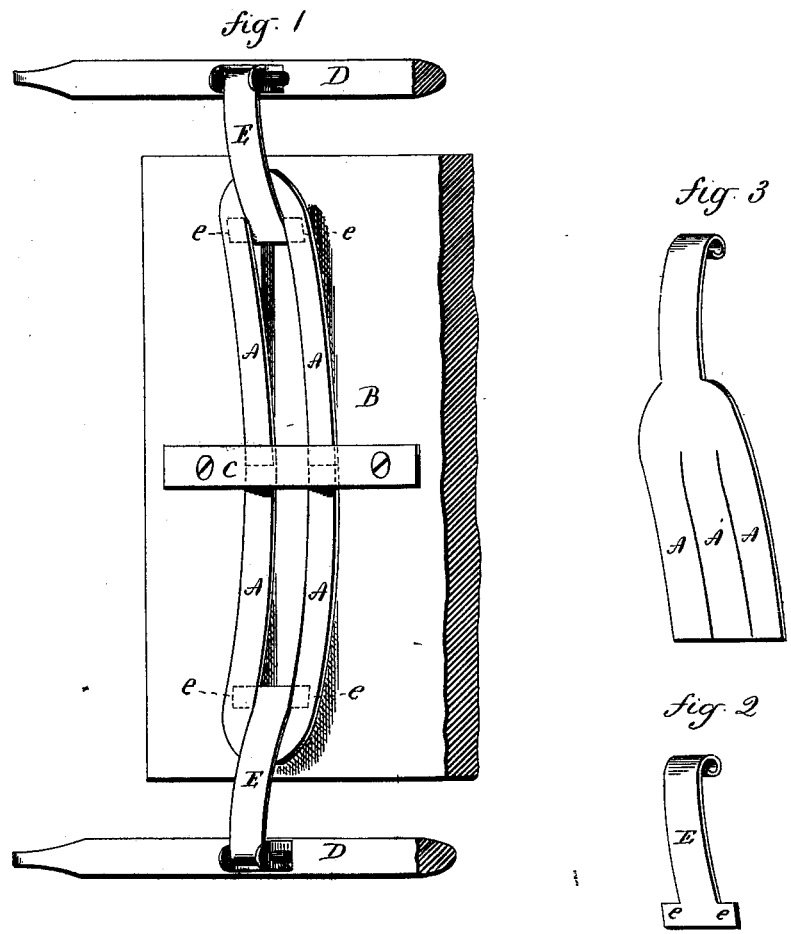

UNITED STATES PATENT OFFICE.

JEREMIAH S. CORBAN, OF PLAINVILLE, CONNECTICUT.

CARRIAGE-SPRING.

SPECIFICATION forming part of Letters Patent No. 231,278, dated August 17, 1880.

Application filed May 3, 1880. (No model.)

*To all whom it may concern:*

Be it known that I, JEREMIAH S. CORBAN, of Plainville, in the county of Hartford and State of Connecticut, have invented a new Improvement in Carriage-Springs; and I do hereby declare the following, when taken in connection with the accompanying drawings and the letters of reference marked thereon, to be a full, clear, and exact description of the same, and which said drawings constitute part of this specification, and represent, in—

Figure 1, a perspective view of the spring applied; Fig. 2, connection detached, and Fig. 3 a modification.

This invention relates to an improvement in that class of carriage-springs commonly called "elliptic" or "semi-elliptic." Such springs are usually made by several thicknesses or leaves, one upon another, each successive leaf shorter than the previous leaf. In such springs the friction of one leaf rubbing upon the other is very great, and the wear correspondingly great, and the greater the number of leaves the less sensitive is the spring.

The object of this invention is to construct a spring which shall be lighter than springs of the same class, and capable of sustaining a greater weight than springs of the same weight, and also be more sensitive; and the invention consists in the construction, as hereinafter described, and particularly recited in the claim.

The main body of the spring is best made in two sections, as shown in Fig. 1, and of U shape, the two sides A A of each part meeting at the center, where they are secured to the body B by a clip or bar, C. The two sides A A are arranged in the same plane. From the closed or free end of the part A A an extension is made to connect the spring to the side bar, D. This extension consists of a T-shaped piece, E, (shown detached in Fig. 2,) the tail of the T corresponding in width substantially to the opening between the two sides A A, so that the two ends of the cross $c$ will extend onto the surface of the sides A A, the tail-piece E lying upon the bearing side of the spring, or so that the end of the spring will bear upon it, while the cross of the T lies upon the opposite side, as seen in Fig. 1. The tail-piece terminates in a head of any desirable form for connection with the side bar, D.

While representing the spring as for a semi-elliptic spring and applied to side bars, it will be readily understood that the spring is designed and adapted to use for all classes of work where semi-elliptic springs are used, or for full elliptic, by connecting the ends of one part with the ends of the other part, substantially as in common elliptic springs.

Instead of making the U-shaped piece and the T-shaped extension, the extension may be formed as a part of the body of the spring, (see Fig. 3,) and when greater strength is required the center may be filled, as seen in Fig. 3, A A representing the two outer parts, as in Fig. 1, and A' the center part.

This construction affords a broad seat or rest for the springs, very much reducing the tendency of the spring to cant or tip, and, being of single thickness, avoids the friction of several leaves arranged one upon the other, and possesses a greater strength than any known elliptic spring of such weight, and at the same time is more sensitive and easy in its movement.

While it is preferable to make the spring in two parts—that is, divided at the center—it may be made without such division.

I claim—

The herein-described carriage-spring, consisting of two or more parts, A A, connected and arranged in the same plane, with connections from each end to the bearing-point, substantially as described.

JEREMIAH S. CORBAN.

Witnesses:
E. F. TOMLINSON,
M. A. NICKERSON.